Figure 1:
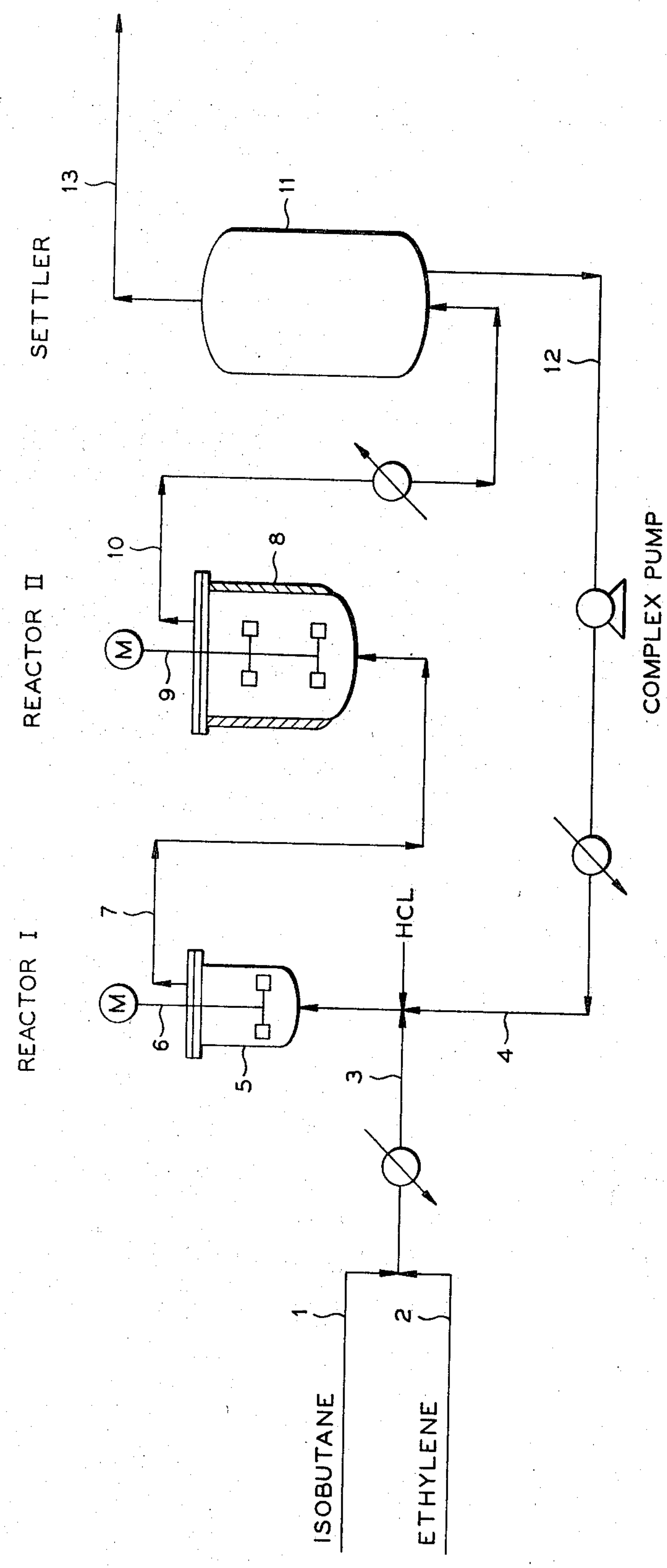

United States Patent [19]

Hutson, Jr. et al.

[11] 3,855,345

[45] Dec. 17, 1974

[54] ALKYLATION OF ISOBUTANE WITH ETHYLENE AND WITH ALUMINUM HALIDE HYDROCARBON COMPLEX CATALYST USING TWO REACTORS IN SERIES

[75] Inventors: Thomas Hutson, Jr.; Donald J. Makovec, both of Bartlesville, Okla.

[73] Assignee: Phillips Petroleum Company, Bartlesville, Okla.

[22] Filed: Sept. 11, 1972

[21] Appl. No.: 287,736

[52] U.S. Cl. ........................ 260/683.45, 260/683.53

[51] Int. Cl. .............................................. C07c 3/56

[58] Field of Search..... 260/683.53, 683.57, 683.45, 260/683.43

[56] References Cited

UNITED STATES PATENTS

| | | | |
|---|---|---|---|
| 2,409,389 | 10/1946 | Ringham | 260/683.57 |
| 2,518,307 | 8/1950 | Groebe | 260/683.53 |
| 2,674,637 | 4/1954 | Manne | 260/683.53 |
| 3,418,391 | 12/1968 | Cabbage | 260/683.57 |
| 2,890,251 | 6/1959 | Flavin et al. | 260/683.53 |
| 2,354,851 | 8/1944 | Danforth | 260/683.45 |

FOREIGN PATENTS OR APPLICATIONS

| | | | |
|---|---|---|---|
| 530,026 | 9/1956 | Canada | 260/683.57 |

*Primary Examiner*—Delbert E. Gantz
*Assistant Examiner*—G. J. Crasanakis

[57] ABSTRACT

In the production of diisopropyl-containing alkylate by alkylating isobutane with ethylene in the presence of an aluminum halide catalyst wherein ethylene, isobutane and catalyst are charged to a first reactor and the effluent therefrom is charged to a second reactor the components are more severely admixed in the first reactor than in the second reactor to produce an alkylate of maximum octane, to convert a maximum of ethylene feedstock to alkylate and to produce an emulsion from the second reactor that will break.

3 Claims, 1 Drawing Figure

ALKYLATION OF ISOBUTANE WITH ETHYLENE AND WITH ALUMINUM HALIDE HYDROCARBON COMPLEX CATALYST USING TWO REACTORS IN SERIES

BACKGROUND OF THE INVENTION

This invention relates to alkylation reactions. In one of its aspects, this invention relates to the alkylation of isobutane and ethylene to produce an alkylation product containing diisopropyl. In another of its aspects, it relates to the production of alkylate products of high research octane number (RON). In still another of its aspects, it relates to the maintenance of high conversion rates for ethylene feedstock into alkylate products.

In one of its concepts this invention relates to the control of reaction conditions of two reactors in series to yield an alkylate reaction product of high RON with minimum sacrifice of conversion of feedstock to alkylate product.

In a commercial operation for the production of alkylate one of the most important criteria is the production of alkylate product having a high research octane number (RON). It has been known that high RON can be maintained in an alkylate product, but this is usually done at the expense of conversion rate of feedstock to alkylate product. Conversely, the maintenance of a high conversion rate of feedstock to alkylate product usually produces, particularly when the alkylate contains diisopropyl, an alkylate product with an RON reduced below that desired. It has now been discovered that the RON can be held at a high level without sacrifice of feedstock conversion by properly maintaining reaction conditions within a pair of reactors operated in series.

It is therefore an object of this invention to produce alkylate product of maximum RON in an alkylation process using two reactors in series.

It is another object of this invention to convert the maximum amount of feedstock in an alkylation process using two reactors in series while producing alkylate product of maximum RON.

Other aspects, objects and the several advantages of this invention will be apparent to one skilled in the art from a study of the disclosure and the appended claims.

SUMMARY OF THE INVENTION

Accordingly, by the process of this invention, diisopropyl containing alkylate is produced by the alkylation of isobutane and ethylene feedstock in the presence of an aluminum halide catalyst by a method comprising:

1. feeding isobutane, ethylene and catalyst into a first agitated reactor wherein the feedstock and catalyst are intimately mixed with high agitation for a short period of contact time;
2. feeding the effluent stream from the first reactor to a second agitated reactor wherein the effluent is subjected to agitation of a degree in a range less than that of the first reactor for a period of time greater than the contact time of the first reactor; and
3. collecting the effluent from the second reactor.

In one embodiment of the invention to produce an alkylate product of maximum RON the contact energy of the agitator within the first reactor is maintained at a level in the range of 15–30 horsepower per thousand gallons of reactor content. Contact energy is defined in terms of the power taken to drive the agitator in a given contact vessel describing the contact vessel in terms of its content in volume during the time of agitation contact between the agitator and the material in the vessel. Since, obviously various size vessels and agitators in combination would yield a varying amount of agitation of the contents of the vessel, contact energy gives a common denominator method for describing the amount of agitation in the vessel.

The contact energy used in agitation of the second reactor vessel contents should be held within the range of about 1/10 to 50 percent of that of the first reactor. Within this range alkylate degradation is minimized. Below this range conversion of feedstock is reduced to a generally commercially unacceptable degree. Above this range it is believed that polymerization or further alkylation of the primary alkylate product reduces the octane number.

A second set of parameters that has been found relevant to maintaining a high octane number without significant reduction of conversion of feedstock in an alkylation reaction is the relationship of the contact time of the reactants within each of the reactor vessels. The contact time within the second reactor vessel should be held within the range of 2 to 6 times the contact time of the more vigorously agitated first reactor vessel. The greater length of contact time within the less strenuously agitated vessel allows for additional conversion of feedstock but does not produce an emulsion that takes an undue amount of time to break, or does not break at all, within the settling vessel.

A preferred embodiment of this invention will now be discussed in connection with the accompanying drawing which shows an arrangement of apparatus suitable for the practice of the invention. While various features of the invention will be discussed in connection with the reactor of isobutane and ethylene in the presence of a liquid aluminum chloride-hydrocarbon complex as the catalyst to produce a diisopropyl containing alkylate, it is to be understood that the invention can be applied to other reactants and to other catalysts such as HF-$BF_3$ catalyst, $AlBr_3$-type catalyst, and the like. Referring now to the drawing an isobutane stream is fed through line 1 and an ethylene stream through line 2 to join in line 3 to feed into line 4 which carries fresh and make-up catalyst to feed into a first reactor 5. Within reactor 5 an agitator 6, here a stirring agitator, is maintained at a speed of about 1000 rpm to produce a contact energy of 20.6 horsepower per 1,000 gallons of reactor vessel content. The liquid is held within the reactor for approximately 0.7 minute after which it is discharged through line 7.

The total effluent from reactor 5 is fed through line 7 into reactor 8. In this reactor the stirring agitator 9 is maintained at approximately 350 rpm to produce a contact energy of 2.6 horsepower per thousand gallons of reactor content. The residence time of material within the second reactor is approximately 3.1 minutes. The effluent from reactor 8 is discharged through line 10 into a settling vessel 11 wherein the catalyst which is denser than the alkylate product settles to the bottom of the vessel from which it is fed through line 12 back to the first reactor.

Within the settling vessel the alkylate product and catalyst separate within about 60 minutes without problems that could be caused because the emulsion does not break. Alkylate product and collected feedstock are removed through line 13 above the catalyst-alkylate interface in the settling vessel. An alkylate was produced having an RON (clear) of 102.0 with a conversion of ethylene feedstock of 95.9 weight percent.

Using the apparatus and method described above a series of runs were made under the following conditions.

| | |
|---|---|
| Reactor 1, All Runs: | |
| Capacity, gal., | 0.24 |
| Temperature, °F., | 125 |
| Pressure, psig., | 250–275 |
| Residence Time, minutes | 0.7 |
| Reactor 2, All Runs: | |
| Capacity, gal., | 1.02 |
| Temperature, °F., | 125 |
| Pressure, psig., | 250–275 |
| Residence Time, minutes | 3.1 |
| Reactant and Catalyst Conditions: | |
| Isobutane Feed, pounds/hr. (liquid) | 25.6 |
| Ethylene Feed, pounds/hr. (liquid) | 1.2 |
| HCl, pounds/hr. | 0.0086 |
| Recycle $AlCl_3$-Hydrocarbon Complex, No./hr. | 132.0 |
| Temperature of Hydrocarbons and Catalyst, °F. | 120–130 |

Using the reaction conditions above: (Table on following page)

| Run | Reactor Outlet Temp., °F | Stirrer RPM Reactor 1 | Stirrer RPM Reactor 2 | Contact Energy HP per 1000 gallons Reactor 1 | Contact Energy HP per 1000 gallons Reactor 2 | Alkylate RON (Clear) | Ethylene Conversion Weight Percent |
|---|---|---|---|---|---|---|---|
| 1 | 122 | 1000 | 690 | 20.6 | 20.1 | 101.3 | 96.8 |
| 2 | 125 | 1000 | 350 | 20.6 | 2.6 | 102.0 | 95.9 |
| 3 | 121 | 500 | 350 | 2.6 | 2.6 | 101.9 | 91.0 |
| 4 | 122 | 1000 | 90 | 20.6 | 0.045 | 101.7 | 94.1 |
| 5 | 117 | 1000 | 0 | 20.6 | 0 | 100.8 | 87.6 |

Observing the table above, comparing runs 1, 2, 4 and 5 using the same 1000 rpm to give the same contact energy in the first reactor but using a different rpm to give different contact energy in the second reactor it will be seen that most of the conversion occurs in the first reactor. This is most readily apparent in run 5 with no agitation in the second reactor showing a drop of less than 10 percent in the ethylene conversion. When agitation or stirrer rpm is highest in both reactor 1 and reactor 2, as in run 1, the greatest conversion of ethylene occurs. This, however, is at the expense of a loss of valuable octane number. Optimum conditions are seen with conditions approximating run 2 wherein the highest octane product with above the maximum conversion of ethylene is observed.

Concerning runs 2 and 3 where the contact energy in the second reactor is held the same while the contact energy in the first reactor is changed it can be seen that the reduction of ethylene conversion can be attributed to the reduced agitation in the first reactor. It should be noted that the octane rating remains substantially the same for runs 2 and 3.

Reasonable variations and modifications are possible within the scope of the foregoing disclosure and the appended claims to this invention the essence of which is that maximum octane rating can be obtained in an alkylate product containing diisopropyl without undue sacrifice of feedstock conversion by maintaining high agitation in the first of a pair of reactors while reducing the rate of agitation and increasing the residence time in the second reactor.

We claim:

1. A method for producing diisopropyl-containing alkylate by the alkylation of isobutane and ethylene feedstock in the presence of an aluminun halide hydrocarbon complex catalyst while maintaining a balance of maximum product research octane number (RON) and maximum ethylene feed conversion efficiency said method comprising:

a. feeding isobutane, ethylene and aluminum halide into a first agitated reactor wherein the feedstock and catalyst are intimately mixed with high agitation wherein the contact energy of the agitator is maintained in the range of 15 to 30 horsepower per 1,000 gallons of reactor content during the contact time between said agitator and said content, b. feeding the effluent stream from said first reactor to a second agitated reactor wherein the effluent is subjected to agitation maintained between 0.1 and 50 percent of said contact energy in said first reactor and with the contact time in said second reactor maintained in the range of 2 to 6 times greater than said contact time in said first reactor, and c. collecting the diisopropyl-containing alkylate effluent from said second reactor.

2. The method of claim 1 wherein said contact energy in said second reactor is maintained at about 12.5 percent of said contact energy in said first reactor and said contact time in said second reactor is about 4.5 times greater than said contact time in said reactor.

3. The method of claim 2 wherein said contact time in said first reactor is about 0.7 minute and said contact time in said second reactor is about 3.1 minutes.

* * * * *

UNITED STATES PATENT AND TRADEMARK OFFICE
CERTIFICATE OF CORRECTION

PATENT NO. : 3,855,345

DATED : December 17, 1974

INVENTOR(S) : Thomas Hutson, Jr.; Donald J. Makovec

It is certified that error appears in the above-identified patent and that said Letters Patent are hereby corrected as shown below:

Column 4, line 51, after "in said" insert -- first --.

Signed and Sealed this

*thirtieth* Day of *March 1976*

[SEAL]

*Attest:*

RUTH C. MASON
*Attesting Officer*

C. MARSHALL DANN
*Commissioner of Patents and Trademarks*